United States Patent [19]

Smith

[11] Patent Number: 5,440,099
[45] Date of Patent: Aug. 8, 1995

[54] WELDING COMPLICATED, DIFFICULT-TO-WELD METAL COMPONENTS

[76] Inventor: Walt Smith, 1698 Blaney Rd., Elgin, S.C. 29045

[21] Appl. No.: 172,836

[22] Filed: Dec. 22, 1993

[51] Int. Cl.⁶ ............................................. B23K 9/173
[52] U.S. Cl. .................................. 219/137 R; 29/1.1; 219/74; 219/125.1
[58] Field of Search .................. 219/74, 125.1, 137 R; 29/1.1, 1.11

[56] References Cited

U.S. PATENT DOCUMENTS

| | | | |
|---|---|---|---|
| 1,467,502 | 9/1923 | Rose | 219/137 R |
| 2,862,294 | 12/1958 | Philip | 219/74 |
| 5,195,226 | 3/1993 | Bornancini | 29/1.1 |

FOREIGN PATENT DOCUMENTS

| | | | |
|---|---|---|---|
| 54-43843 | 4/1974 | Japan | 219/74 |
| 52-76242 | 6/1977 | Japan | 219/74 |
| 55-45521 | 3/1980 | Japan | 219/61 |
| 60-133981 | 7/1985 | Japan | 219/74 |

*Primary Examiner*—Clifford C. Shaw
*Attorney, Agent, or Firm*—Michael A. Mann

[57] ABSTRACT

The present invention is a method for welding difficult-to-weld metal components as illustrated in the welding of a receiver for a weapon. The method reduces net distortion by a number of techniques, including: (1) cooling the weld with Carbon Dioxide ($CO_2$) preheated with the welding torch tip; (2) use of not more than approximately 4% oxygen in the shield gas to enable hotter, faster welding; (3) the use of a reduced voltage and wire feed rate at the end of a weld to avoid cracking; (4) the intentional use of distortion to reduce net distortion; and (5) sequencing of welds to reduce distortion. Distortion can be introduced in the stamped parts as they are made or when placed in a fixture for welding that, when welded, have less distortion than before. Distortion can also be countered by welding parts in a sequence where a subsequent weld reduces the distortion of a previous weld. The process is illustrated as applied to a receiver for a weapon made by welding non-compatible and low carbon steels in a low tolerance configuration.

56 Claims, 3 Drawing Sheets

WELDING COMPLICATED, DIFFICULT-TO-WELD METAL COMPONENTS

BACKGROUND OF THE INVENTION

1. Field of the Invention

The present invention relates to welding, and, in particular, to welding complicated, difficult-to-weld components made of heat treatable steels for receivers of machine guns.

2. Discussion of Background

Metal components can be made by casting, machining, welding, forging or a combination of two or more of these processes. The choice of process depends on the component and cost. If the component is composed of parts made of different materials, welding those different parts together is the desirable choice (assuming that the parts are to be permanently fastened together). However, when the component is "complicated" to weld, that is, it is (1) made of a relatively large number of components, (2) asymmetric, (3) made of incompatible or heat treatable metals, (4) made of metals of different thicknesses, and (5) required to meet close tolerances, the difficulties in manufacturing can be almost insurmountable, at least at a cost that the purchaser will accept.

The goal of the manufacturing process is to make components that meet quality and dimensional requirements with minimal rejects at reasonable cost. Certain aspects of manufacturing are known to produce better quality welded components: making parts that meet fine tolerances; assembling the parts in a jig or fixture that holds each part in the correct relative position; using robotic welders in conjunction with a referenced work surface to assure a repeatable, controllable welding operation; checking the tolerance of finished parts; carefully controlling heat deposition; cleaning the parts and fixtures frequently. These are well known.

Manufacturing complicated components such as receivers for machine guns used in combat is especially important. The conditions of combat are hard on weaponry, especially a machine gun, yet the weapon must remain ready to fire. Also, it is important to contain the cost of a weapon that is used in large numbers. Being able to weld the parts of a receiver together effectively will keep the cost of the receiver lower than other manufacturing alternatives. Consequently, there remains a need for a welding process for complicated components that can yield a finished work product meeting close tolerances.

SUMMARY OF THE INVENTION

According to its major aspects and briefly stated, the present invention is a process for welding metal parts together. The process begins by placing the parts in a fixture. The parts thus held define a joint at their interface. Then, a first gas mixture is directed at the joint to establish an environment suitable for arc welding, that is, an environment that is substantially, although not entirely in the present invention, inert. The joint has a periphery and a center. Beginning at some point on the periphery, the welding robot applies its torch to weld along the periphery of the joint. When the two parts are molten, the welding torch continues the weld, however, at lower energy deposition parameters to allow the periphery and the midsection of the plug weld to cool gradually. This slowed cooling rate in turn helps prevent stresses that cause cracking in the alloys being welded.

Using a flow of a second gas mixture, the molten, diffusing metal of the welded parts is cooled until no longer red. Before it is allowed to reach the molten metal, the second gas mixture is preheated by directing it past the torch tip where it picks up heat. Preheating prevents thermal shock, but the gas quickly cools from its first, preheated temperature to a second, lower temperature.

Welds produce some distortion no matter how quickly and carefully they are cooled. However, in the present invention, the distortion of one weld is used to offset the distortion produced by another weld. Distortion is thus deliberately introduced into one metal part by the fixture or by the distortion produced by a first weld only to be offset by a subsequent weld.

Cooling the welds is a very important feature of the present invention. The goal of the process is to produce welded components meeting tight tolerances. Therefore, minimizing "net" distortion is crucial. Closely related to minimization of net distortion is reducing absolute distortion. By cooling the welds until they are no longer red hot, the heat-affected zone (HAZ) is greatly reduced, resulting in less distortion as well as reduced potential for cracking.

Preheating the cooling gas, preferably $CO_2$, is also very important in the cooling process. Thermal shock is conveniently avoided by directing the cooling gas past the hot tip of the welding torch. The gas cools the tip (helping to prolong the life of the torch tip, incidentally), picking up its heat just before it reaches the joint.

Another very important feature of the present invention is the method of welding each joint: the melting starts with the periphery and ends at the center with a slightly lower energy deposition level. The stresses of the periphery can be relieved as it cools while the center is still molten. This technique greatly reduces cracking of the center of a weld, especially a plug weld.

Still another very important feature of the present invention is the intentional use of distortion to offset distortion produced in the welding process. This intentional distortion can be introduced by the fixture or in forming one of the parts or it can be introduced by applying heat with the welding torch for a long enough time to distort one side of a component so that the net distortion is minimized. Because complex components are not always symmetric, countering distortion in this manner is vital to producing components that are within tolerances.

These are other features and advantages of the present invention which will be apparent to those skilled in the art of welding from a careful reading the Detailed Description of Preferred Embodiments accompanied by the following drawings.

DETAILED DESCRIPTION OF A PREFERRED EMBODIMENT

The present invention is a process that is generally applicable to the manufacture of complicated components by welding, such as receivers for weapons. There are many different kinds of complicated components, receivers being but one of many, and the present process is not intended to teach those skilled in the art of welding components exactly how to make every complicated component without some minimal experimentation, but it provides them with a method that includes a number of techniques for welding components that will result in reduced distortion and fewer out-of-tolerance, rejected components. In some cases, the techniques of the present method will enable those skilled in welding to devise procedures for manufacturing components previously believed to be too difficult to weld at any reasonable cost.

The techniques of the present invention include, among others to be described herein, (1) cooling the weld with preheated coolant gas; (2) use of a small but significant amount of oxygen in the shield gas to enable hotter, faster welding; (3) the use of a reduced voltage, wire feed rate at the end of a weld to relieve stress; (4) the intentional use of distortion to reduce net distortion; and (5) sequencing of welds to reduce distortion. These techniques will be illustrated in the welding of a component that is difficult to weld, namely a receiver for a weapon.

The choice of the type of welding is an important feature of the present invention. The choice is Gas Metal Arc Welding (or GMAW). GMAW welding is in some ways more forgiving than electron beam and laser welding and easier than GTAW (Gas Tungsten Arc Welding), making it a preferred choice for this complicated component. In the case of electron beam and laser welding, the two parts that are to be welded must overlap so that when they melt, the overlapped materials melt together. In GMAW welding, the materials may touch or a gap can be left between the materials to be filled with a third material supplied by the welder. The gap can be larger or smaller and the weld can still take place because of the supplied material. Therefore, as long as the fixture holds the two parts in proper spatial alignment, they can be welded together notwithstanding a relatively larger or smaller gap between them.

As a difference between GMAW and GTAW welding, the latter requires the welding torch to negotiate around a wire supplied to fill the gap. In GMAW welding, the filler metal is the electrode, so there is nothing to interfere with the welding tip and, therefore, maneuvering around complicated parts is easier and quicker.

In reducing distortion that might cause a welded component to be out of tolerance, several techniques are employed. Clearly, parts must be made to meet close tolerances for the final, assembled component to be within tolerance. Also, a jig or fixture should hold the parts together in precise alignment so that, when welded, the component made from those welded parts meets positional requirements. A fixture or mandrel can also serve as a heat sink that removes heat from a weld more quickly so that the heat-affected-zone (HAZ) is smaller or distortion from the heat is reduced. The fixture can also limit distortion by holding parts together so that they cannot distort when welded together, or can introduce distortion that will be counteracted by the distortion of the welding process itself so that the "net" distortion is less. The fixture material should have excellent heat conduction properties, but should not be made of a metal that is too soft compared to the workpiece metal. If the workpiece is made of steel, mandrills and fixtures made of brass or bronze are not suitable.

Figure 1:
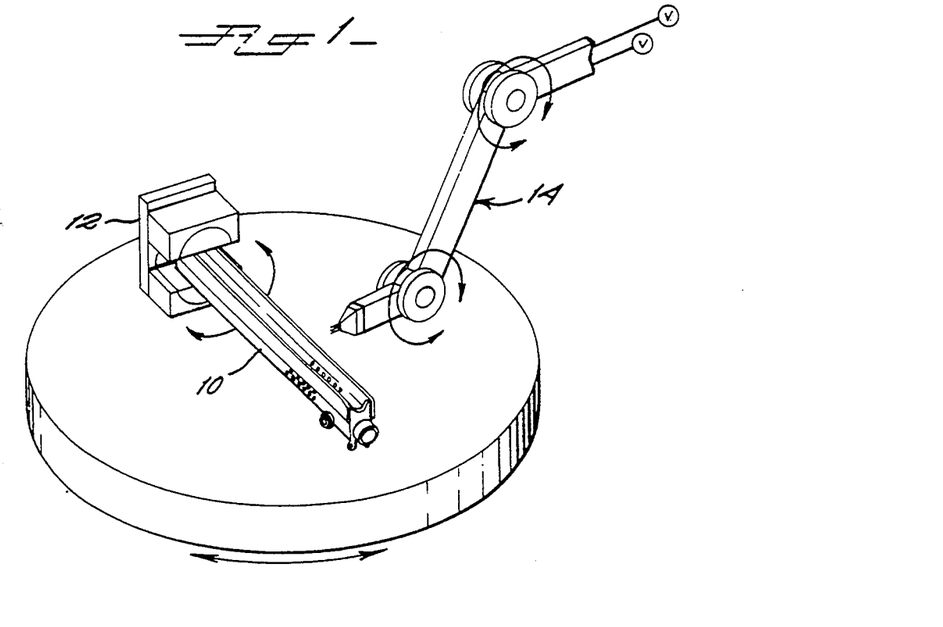
FIG. 1 is a perspective view of a component in a fixture being welded by a torch according to a preferred embodiment of the present invention.

FIG. 1 illustrates a component 10 held in a fixture 12 in proximity to a Gas Metal Arc Welding, robotic welding torch 14. Fixture 12 is adapted to rotate component 10 about a number of axes so that any side or end where welding needs to be done can be presented. Torch 14 also is capable of relative freedom of movement so that it can approach component 10 from the side or top, as desired.

Sequencing of the welds is important in reducing distortion of the final product. Symmetric welds are made first, making sure that two welds that are physically close together are not made chronologically close together. Welds that are not being made simultaneously are made with the workpiece lying so that the side to be welded is facing up. A higher quality weld can be achieved when the joint is in the flat position, because the adverse impact of gravity on the molten metal is controlled.

Also, if multiple parts are to be welded to a body and if some of the parts have more than one joint, welding one joint at a time on each part to the body until all the parts have been attached is preferable to welding all of the joints of one part to the body and then proceeding to weld the other parts. This preference is especially important when parts are close enough so that welding one distorts the body so that it affects the other.

Counteracting distortion to reduce net distortion can be done in other ways. For example, by welding opposing sides of the same object simultaneously with two welding torches, distortion that would otherwise be caused can be avoided or reduced. Welding one part may counter distortion caused by welding a second part. In particular, a joint can be welded in such a way as to intentionally cause more stress than would otherwise be caused so that, not only will the part be welded, but also the stress caused by the welding of that joint will counter the stress of welding another joint. Finally, in one case a second weld is made to counter the distortion produced by a first weld, and then a third weld is made to counter the net distortion produced by the second weld.

Other features of the present inventive process, related to the welding technique, reduce distortion. For example, in the present process, a coolant gas is used to reduce the temperature of the weldment more quickly. In particular, this gas, Carbon Dioxide ($CO_2$), is directed onto the weldment until the red color has faded, usually less than about five seconds. The initial burst of Carbon Dioxide ($CO_2$) is not cold, but is warmed by the still-hot tip of the welding torch. The gas cools in about one-half second and is carefully metered by the robot using a solenoid valve.

The choice of "shielding" gas for welding is another example of a nonobvious feature of the present invention. Typical mixtures include argon and helium in a 50%:50% or 75%:25% ratio. In the present invention, two gas mixtures are used, one for the robotic welding and one for rework welding. The robotic welding gas mixture is 91% argon, 5% Carbon Dioxide ($CO_2$), and not more than 4% oxygen. The use of oxygen is counterintuitive, because oxygen tends to promote oxide formations. However, in this mixture, the oxygen produces a hotter arc that enables faster welding—115 inches per minute or more—with less spatter and a smaller heat affected zone. The speed enables use of a weaving pattern, a rapid side-to-side movement of the welding torch in fillet welds, for reduced heat deposition. The rework gas mixture is 90% argon and 10% helium. Both mixtures are thoroughly homogenized and the percentages are controlled to within $\frac{1}{4}$%.

Finally, when a weld is made, the angle of the weld torch is selected so that the diffusion of the heat does not result in burning through the metal or any unnecessary concentration of heat. For example, if a thick piece of metal is to be welded to a thin piece of metal, the weld torch may draw an arc with the thick piece. Heat from the thick piece is conducted to the thin piece. The weld torch may be held at an angle to cause the arc to be drawn close to the joint, but far enough from the thin piece so that the arc is drawn to the thick piece.

Figure 5:
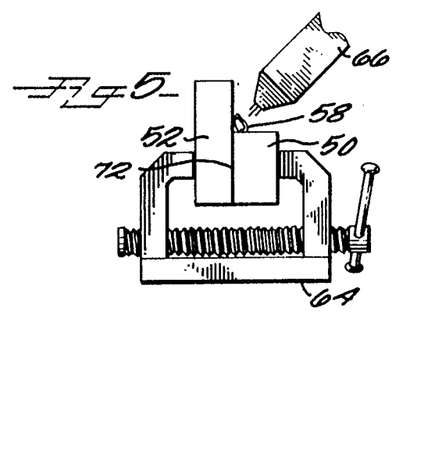
FIG. 5 illustrates a side view of a set of parts to be welded according to a preferred embodiment of the present invention.
Figure 6:
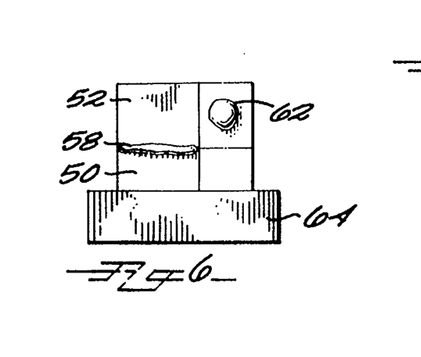
FIG. 6 illustrates an end view of a set of parts to be welded according to a preferred embodiment of the present invention.
Figure 7:
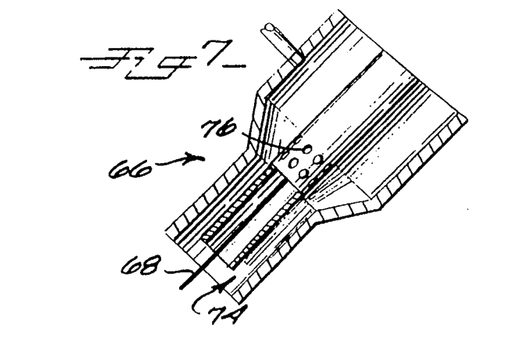
FIG. 7 illustrates a cross section of a welding torch according to a preferred embodiment of the present invention.
Figures 8, 9:
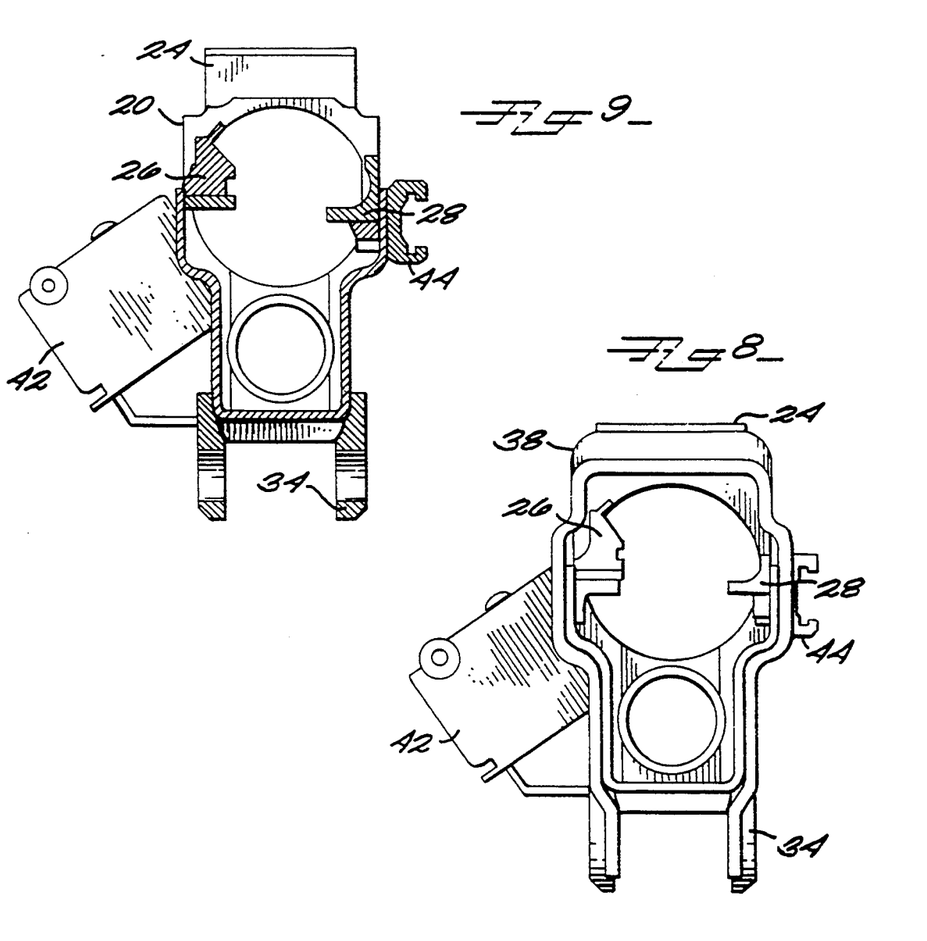
FIG. 8 is an end view of the receiver according to preferred embodiment of the present invention.
FIG. 9 is a cross sectional view of the receiver taken along lines 9—9 of FIG. 3.

FIGS. 5–7 illustrate the welding of several parts together. There is a first part 50 being welded to a second part 52 using a fillet weld 58. A plug weld 62 is being made in second part 52. First part 50 and second part 52 are held together in a fixture 64. A welding torch 66 with a wire 68 is used to strike the arc between first and second parts 50, 52 and deposit a quantity of wire onto the joint 72. A first gas is used to shield weld 58 during welding from oxidation by passing it through a first passage 74 in torch 66 toward joint. A second gas is used to cool weld 58 subsequent to welding by passing it through a second passage 76 in torch 66.

The foregoing principles of the present invention can be illustrated in the manufacture of a receiver for a weapon, a relatively difficult-to-weld component. As illustrated in FIGS. 2–4, 8 and 9, the finished receiver is made of a number of parts welded to a receiver body 20. In particular, the parts include a barrel support 24, a left and right slide guide 26, 28, a front bushing 32, a trigger frame support 34, a rear block 38, a magazine support sleeve 42, a cocking handle guide 44, gas cylinder support 46, and a support feed box 48. The receiver body 20 is made of low carbon steel, such as AISI mild steel 1018, die cut and stamped from thin, 1.75 mm, sheets.

Figure 2:
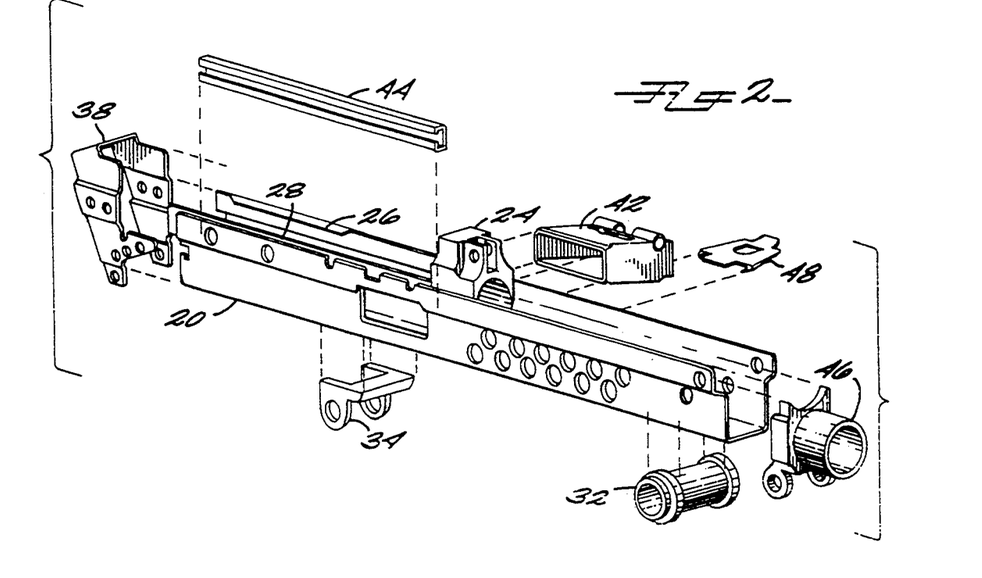
FIG. 2 is a perspective, exploded view of a receiver to be welded according to a preferred embodiment of the present invention.

Some of the parts are made of higher carbon steel. For example, the cocking handle guide 44, and the trigger frame, gas cylinder and barrel supports 34, 46, 24, respectively, are made of a carbon steel alloy, such as AISI 8620; and the left and right slide guides 26, 28, are made of a different carbon steel alloy, AISI 1040. The rear block 38 and front bushing 32 are made of the same steel type as receiver body 20. The magazine support sleeve 42 and support feed box 48 are made of other low carbon steels, AISI 1010 and AISI 1015, respectively.

In addition to being made of different steel alloys, the parts have different thicknesses than the receiver body 20. Front bushing 32, trigger frame support 34, barrel support 24, left and right guides 26, 28, and gas cylinder support 46 are all 3.3 mm thick, rear block 38 is 2.97 mm thick, magazine support sleeve 42 assembly is 1.5 mm thick; cocking handle guide 44 is 4.4 mm thick. Only support feed box 48 is the same thickness (and same steel alloy) as receiver body 20.

The welding is done with a well-homogenized mixture of 91% argon, 5% Carbon Dioxide ($CO_2$) and 4% oxygen controlled to within $\frac{1}{4}$%. The gas flow rate is 40+5 cubic feet per hour.

The welding fill wire is ER70S-7, meeting the specification in AWS 5.18, and having a diameter of 0.030 inches. All welding is direct current, gas metal arc welding using a robotic welder, but the joint designs and transfer modes will vary. For example, front bushing 32 and gas cylinder support 46 joints are fillet welds transferred by short arc. So are magazine support sleeve 42, support feed box 48 and trigger frame support 34 joints. But barrel support 24 and rear block 38 joints are each a series of plug welds transferred by spray. The left and right slide guides 26, 28 are plug slot and plug welds transferred by spray. Cocking handle guide 44 is joined to receiver body 20 by several single —J— groove weld top, a single groove weld, a double —J— groove weld bottom transferred by short arc. All fillet welds and groove welds (except for support feed box 48 and one of magazine support sleeve 42 welds) are done with a "weaving" motion; that is, a high speed, back-and-forth motion, to minimize heat deposition. These welds progress more slowly than plug and plug slot welds, typically 16–25 inches per minute as compared to 75–115 inches per minute, respectively. The voltage at which the welding takes place is also a function of the type of weld. For plug and plug slot welds, the voltage is higher, typically in the range of 20.4 up to 23.1 volts; for fillet and groove welds, typically in the range of 16.4 up to 20.5. These voltages are controlled to within approximately 8%.

The first six welds are done by two computer-controlled robotic torches acting simultaneously, approaching receiver body 20 from the side and from opposing sides of the receiver. The front bushing 32 welds are made first, followed by two of the eight welds to rear block 38, trigger frame support 34, two of the eight barrel support 24 welds, one weld on each end of slide guides 26, 28. At that point all of the parts are held by at least one weld to receiver body 20 and all the parts are welded to receiver body 20 by one weldment before any other weldments are made. Note that no two welds are adjacent: the welded area is permitted to cool before another weld is made in that area. Simultaneous welds on opposite sides of the receiver counteract distortion caused by the welding.

Subsequent welds are done by first rotating the receiver body 20 so that the side to be welded is flat and then both robotic torches approach that side from above. First one side is completed and then the receiver body 20 is rotated so that the other side can be completed.

In performing each of these welds, an important feature of the present invention is the specifics of the welding technique. In particular, the welding begins at the periphery of the joint, defined as the boundary between two parts or, in the case of the receiver, between the receiver body and a part where plug welding is to take place or at the end of a fillet weld. The welding torch proceeds to weld the peripheral portion of the joint and then moves to the center. At that point the voltage is reduced and the wire feed rate is reduced for a short time. Then the welding of that joint is completed, but the shield atmosphere continues for a fraction of a second longer. This portion of the welding is referred to as the "arc end" and is important for reducing cracking as the weld cools, because it keeps a portion of the weldment molten as the first part of the weld relieves stress.

For example, in the first receiver weld made by robot number 1, the slave robot, in which a fillet weld is made to attach the right side of the bushing to the receiver body, the weld is nominally made with a voltage of 16.5 volts and a wire feed of 292 inches per minute. At the arc end, the voltage is reduced to 11.5 volts and the wire feed to 110 inches per minute for 0.1 seconds. Then the shield gas is continued for 0.5 seconds more.

Figure 3:
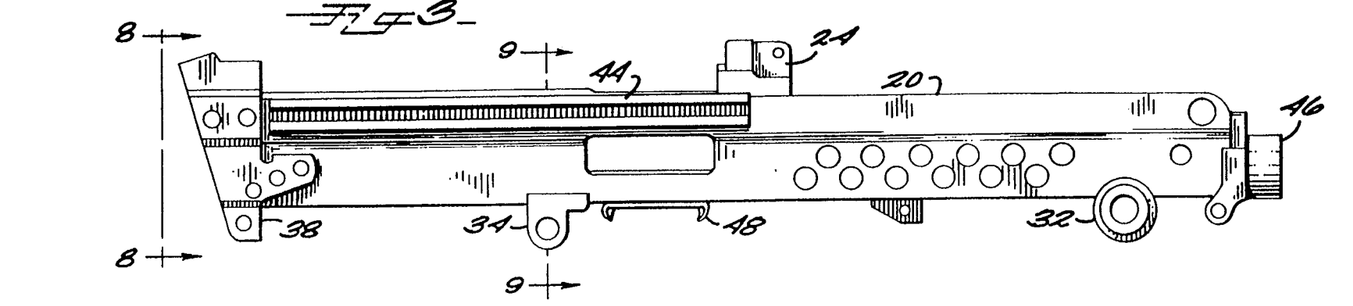
FIG. 3 is a right side view of a receiver welded according to a preferred embodiment of the present invention.
Figure 4:
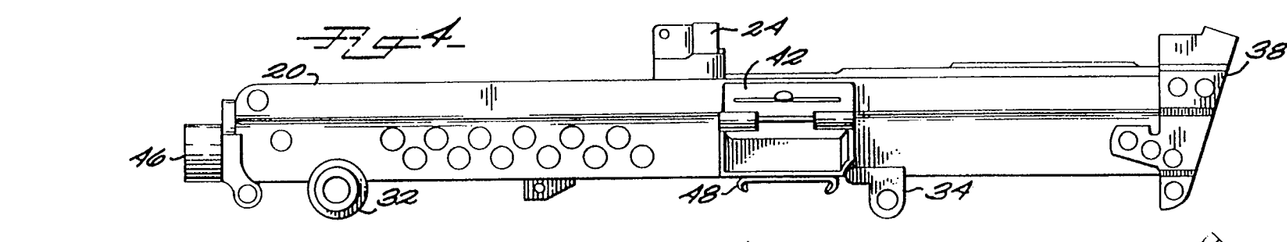
FIG. 4 is a left side view of a receiver welded according to a preferred embodiment of the present invention.

Using FIGS. 3 and 4 to illustrate the sequence of welds, front bushing 32 is welded on both sides simultaneously, using two welding torches. Next, at the extreme opposite end of receiver body 20, rear block 38 is welded on both sides simultaneously, then trigger frame support 34 followed by barrel support 24, all welded on opposing sides simultaneously. The left slide guide 26 (see FIG. 3) is welded to the left side of receiver body 20 as right slide guide 28 is welded to the right side of receiver body 20. Next gas cylinder support 46 is welded to receiver body 20 by robotic torch 1 (slave) as a second plug weld of rear block 38 is made by robotic torch 2 (master), receiver body having been turned on its right side so that both robotic torches can approach receiver body 20 from the same side. Welds are made to the barrel support 24 and the right slide guide simultaneously by the master and slave torches, respectively, followed by the rear block 38 and left slide guide 26 welds.

From that point on only the master torch performs welding. Another barrel support 24 weld is made to the right side of receiver body 20 followed by another rear block 38 and a barrel support 24 weld. Then receiver body 20 is rotated to its left side. Using the master torch, the left side of the gas cylinder support is welded, followed by several magazine support sleeve 42 welds, a left slide guide 26 weld, and a series of three barrel support 24 welds alternated with a series of three rear block 38 welds, then additional magazine support sleeve 42 welds. Finally, the six cocking handle guide 44 welds are made and then the feed box support 48 welds are made.

Table 1 illustrates the voltages, currents, wire speed and travel speed for each receiver weld and the corresponding arc end. Using the foregoing techniques in welding a receiver results in welds with good cosmetic appearance without spatter; only minor, if any melt through and none with protrusions; and no cracks. Plug welds have fusion at the base to 6.32 mm minimum and side fusion of 1.4 mm minimum; fillet welds have a leg length of 1.6 mm minimum and a leg fusion of 1.6 mm minimum. The porosity diameter is 1.6 mm or less and does not exceed 3.2 mm in any 25.4 mm of weld. Undercut at the end of fillet and butt welds does not exceed 0.16 mm maximum at the toe. Fillet welds are slightly concave to slightly convex; butt welds are flat to slightly convex, plug welds are slightly concave to slightly convex.

It will be apparent to those skilled in welding that many changes in the foregoing description of the present invention, and in particular to the illustration of the preferred embodiment of the present invention as applied to the manufacture of a receiver for a weapon, can be modified or changed without departing from the spirit and scope of the present invention, as defined by the appended claims.

TABLE 1

| # | PART | WELD | | | | ARC WELD | | | |
|---|---|---|---|---|---|---|---|---|---|
| | | VOLTS | CURRENT (AMPS) | WIRE FEED (IPM) | TRAVEL (IPM) | VOLTS | WIRE FEED | ARC END TIMER | POST FLOW TIMER |
| | | | | SLAVE (ROBOT 1) | | | | | |
| 1. | FRONT BUSHING | 16.5 | 125 | 292 | 18 | 11.5 | 110 | .1 | .5 |
| 2. | REAR BLOCK | 20.4 | 220 | 680 | 75 | 14.1 | 134 | .4 | .5 |
| 3. | TRIGGER FRAME SUP. | 16.6 | 125 | 295 | 18 | 11 | 110 | .2 | .5 |
| 4. | BARREL SUP. | 21.2 | 225 | 650 | 100 | 11 | 116 | .5 | .7 |
| 5. | RT GUIDE | 21.5 | 140 | 576 | 115 | 0 | 0 | 0.2 | 0.5 |
| 6. | RT GUIDE | 21.5 | 200 | 650 | 100 | 0 | 0 | .2 | .5 |
| 7. | GAS CYL SUP. | 16.4 | 140 | 316 | 18 | 17 | 248 | .3 | .7 |
| 8. | BARREL SUP. | 23.2 | 200 | 706 | 115 | 18 | 236 | .4 | .7 |
| 9. | RIGHT GUIDE | 21.2 | 190 | 600 | 100 | 13.5 | 120 | .4 | .5 |
| | | | | MASTER ROBOT 2 | | | | | |
| 1. | FRONT BUSHING | 16.5 | 135 | 316 | 18 | 13 | 110 | .2 | .5 |
| 2. | REAR BLOCK | 20.4 | 220 | 680 | 75 | 14 | 130 | .3 | .5 |
| 3. | TRIGGER FRAME SUP. | 16.8 | 130 | 300 | 17 | 13.5 | 116 | .2 | .5 |
| 4. | BARREL SUP. | 21.2 | 225 | 650 | 100 | 13.5 | 116 | .5 | .7 |
| 5. | LEFT GUIDE | 22.0 | 215 | 650 | 100 | 13.5 | 124 | .5 | .7 |
| 6. | LEFT GUIDE | 22.0 | 215 | 650 | 100 | 14.2 | 136 | .5 | .6 |
| 7. | REAR BLOCK | 23.1 | 250 | 710 | 115 | 13.5 | 120 | .4 | .5 |
| 8. | LEFT GUIDE | 23.1 | 245 | 710 | 115 | 11.0 | 110 | .2 | .5 |
| 9. | REAR BLOCK | 23.1 | 250 | 710 | 115 | 18 | 236 | .4 | .7 |
| 10. | BARREL SUP. | 23.1 | 250 | 710 | 115 | 12.5 | 116 | .5 | .7 |
| 11. | REAR BLOCK | 23.1 | 250 | 710 | 115 | 13.5 | 114 | .2 | .5 |
| 12. | BARREL SUP. | 23.1 | 250 | 710 | 115 | 11 | 40 | .5 | .7 |
| 13. | GAS CYL. SUP. | 16.5 | 140 | 330 | 18 | 15 | 180 | .7 | .7 |
| 14. | MAG BOX SLEEVE | 17.5 | 135 | 326 | 19 | 13.5 | 120 | .5 | .5 |
| 15. | MAG BOX SLEEVE | 17.5 | 135 | 326 | 19 | 13.5 | 120 | .5 | .5 |
| 16. | MAG BOX SLEEVE | 17.5 | 135 | 326 | 19 | 13.5 | 120 | .4 | .5 |
| 17. | LEFT GUIDE | 21.0 | 215 | 650 | 100 | 13 | 110 | .2 | 1.0 |
| 18. | BARREL SUP. | 23.1 | 250 | 710 | 115 | 18 | 236 | .7 | .7 |
| 19. | REAR BLOCK | 23.1 | 250 | 710 | 115 | 18 | 236 | .5 | .7 |
| 20. | BARREL SUP. | 23.1 | 250 | 710 | 115 | 12 | 116 | .4 | 1.0 |

TABLE 1-continued

| # | PART | WELD | | | | ARC WELD | | | POST |
| | | VOLTS | CURRENT (AMPS) | WIRE FEED (IPM) | TRAVEL (IPM) | VOLTS | WIRE FEED | ARC END TIMER | FLOW TIMER |
|---|---|---|---|---|---|---|---|---|---|
| 21. | REAR BLOCK | 23.1 | 250 | 710 | 115 | 18 | 236 | .6 | .7 |
| 22. | BARREL SUP. | 23.1 | 250 | 710 | 115 | 18 | 236 | .6 | 1.0 |
| 23. | REAR BLOCK | 23.1 | 250 | 710 | 115 | 18 | 236 | .6 | .7 |
| 24. | MAG BOX SLEEVE | 17.5 | 110 | 240 | 16 | 13.8 | 150 | .3 | 1.5 |
| 25. | MAG BOX SLEEVE | 17.5 | 110 | 240 | 17 | 13.5 | 130 | .5 | 1.5 |
| 26. | MAG BOX SLEEVE | 17.5 | 110 | 240 | 16 | 13 | 116 | .2 | .2 |
| 27. | MAG BOX SLEEVE | 17.5 | 110 | 228 | 17 | | | | |
| 28. | COCKING HAND GUIDE | 20.5 | 175 | 440 | 19 | 13.5 | 150 | .5 | 1.0 |
| 29. | COCKING HAND GUIDE | 20.5 | 165 | 430 | 19 | 13.5 | 15 | .5 | 1.0 |
| 30. | COCKING HAND GUIDE | 18.8 | 140 | 340 | 21 | 13.5 | 120 | .5 | 1.0 |
| 31. | COCKING HAND GUIDE | 19.2 | 145 | 355 | 21 | 13.5 | 150 | .6 | 1.0 |
| 32. | COCKING HAND GUIDE | 18.0 | 135 | 315 | 21 | 11.5 | 110 | .5 | 1.0 |
| 33. | COCKING HAND GUIDE | 17.1 | 110 | 265 | 21 | 15 | 120 | .6 | 1.0 |
| 34. | COCKING HAND GUIDE | 19.5 | 135 | 340 | 25 | 13 | 120 | .5 | 1.0 |
| 35. | COCKING HAND GUIDE | 19.5 | 140 | 350 | 22 | 13 | 120 | .5 | 1.0 |
| 36. | SUPPORT FEED BOX | 18.6 | 110 | 240 | 23 | 13.5 | 116 | .5 | 1.0 |
| 37. | SUPPORT FEED BOX | 17.1 | 110 | 250 | 21 | 13.3 | 108 | .1 | .6 |

What is claimed is:

1. A process for welding a first part to a second part, said process comprising the steps of:

placing said first part proximate to said second part so as to define a joint therebetween, said joint having a periphery and a center;

applying a first electrical potential difference between a wire and said first part near said joint;

blowing a first gas mixture onto said joint to displace substantially all air from the vicinity of said joint;

moving said wire proximate to said joint until said first part, said second part and said wire become molten, said molten wire fills said joint, diffusing into said first part and said second part;

reducing said first electrical potential difference to a second electrical potential difference lower than said first potential difference after said first and said second parts become molten;

applying said second electrical potential difference to said center of said joint so that cooling is slowed in said center with respect to said periphery; and blowing a second gas mixture onto said joint to cool said joint.

2. The process as recited in claim 1, wherein said second gas includes Carbon Dioxide ($CO_2$).

3. The process as recited in claim 1, wherein said blowing step further comprises the step of preheating said second gas for an interval of time before said gas is blown onto said joint so that said second gas is warmed when it first reaches said joint, but cools by the end of said interval of time.

4. The process as recited in claim 1, where said first gas mixture contains up to 4% oxygen.

5. The process as recited in claim 1, wherein said first part is distorted before said wire is moved toward said first part, and said moving step further comprises the step of continuing to heat said first part until said first part is not distorted.

6. A process for arc welding a plurality of parts to a body, said body having a first side and an opposing, second side, said process comprising the steps of:

placing said body in a fixture so that said body is distorted;

placing each part of said plurality of parts in engagement with said body, said each part and said body defining a joint therebetween;

arc welding said each part of said plurality of parts to said body in the presence of a first gas mixture;

continuing to heat said body until said joint is no longer distorted; and cooling said plurality of parts and said body with a second gas mixture alter each part of said plurality of parts has been arc welded for a period of time after said joints are welded.

7. The process as recited in claim 6, wherein at least one part of said plurality of parts defines at least two symmetric joints with said body, said process further comprises the steps of arc welding said symmetric joints substantially simultaneously.

8. The process as recited in claim 6, wherein first gas mixture of said arc welding step includes up to approximately 4% oxygen.

9. The process as recited in claim 6, wherein said second gas mixture includes Carbon Dioxide ($CO_2$).

10. The process as recited in claim 6, wherein said cooling step further comprises the step of lowering the temperature of said second gas mixture from a first temperature to a lower, second temperature during said interval.

11. The process as recited in claim 6, wherein said interval is less than approximately one second and more than approximately one-quarter second.

12. The process as recited in claim 6, wherein said each joint has a center and a periphery, and said arc welding step further comprises the steps of:

heating said periphery until said each part and said body are molten at said joint; and then heating said center.

13. The process as recited in claim 6, wherein each joint is adjacent to at least one adjacent joint and is not adjacent to at least one nonadjacent joint, and wherein said arc welding step further comprises arc welding nonadjacent joint after welding said each joint.

14. The process as recited in claim 6, wherein said body has a first side and an opposing second side and said at least one part includes a first part on said first side and a second part on said second side, and said arc welding step further comprises the step of:

arc welding said first part to said first side, said arc welding step resulting in a distortion of said body; and arc welding said second part to said second side so that said second part is welded to said body and said distortion is off set.

15. A process for making a receiver for a weapon, said process comprising the steps of:
forming a receiver body from sheet steel;
placing said receiver body in a fixture;
distorting said receiver body:
clamping metal parts of said receiver to said receiver body, said parts and said body defining joint therebetween;
arc welding said parts to said receiver body in the presence of a first gas mixture;
continuing to heat said receiver body until said distortion is eliminated; and
removing said receiver from said fixture.

16. The process as recited in claim 15, further comprising the steps of cooling said joints following said arc welding step.

17. The process as recited in claim 15, further comprising the steps of:
warming a second gas mixture to a first temperature; and
blowing said warmed second gas mixture onto said joints after each joint is arc welded;
allowing said warmed second gas mixture to cool from said first temperature to a second, lower temperature to cool said joint gradually in a first interval.

18. The process as recited in claim 15, wherein said arc welding step is performed by a welding torch having a tip that becomes hot in arc welding and said process further comprises the step of blowing a second gas mixture by said tip and onto said joints after said joints are arc welded so that said gas mixture can absorb heat from said torch, whereby said gas mixture is preheated to a first temperature before striking said arc welded joint, said gas mixture cooling from said first temperature to a second, lower temperature.

19. The process as recited in claim 15, further comprising the step of cooling said arc welded joints until said joints are no longer red hot.

20. The process as recited in claim 15, wherein said joints have a center and a periphery, and wherein said arc welding step further comprises the steps of:
heating said periphery until said receiver body and said part are molten near said joint;
heating said center.

21. The process as recited in claim 15, wherein said receiver body has a first side and an opposing, second side, and said joints include a first joint on said first side and a second joint on said second side of said receiver body, said arc welding step further comprising the steps of:
arc welding said first joint on said first side, said arc welding producing a first distortion of said receiver body; and
arc welding said second joint on said second side so that said second joint is welded, said arc welding of said second joint producing a second distortion, said first and said second distortion off-setting each other.

22. The process as recited in claim 15, where in said arc welding of said joints is done in a sequence so that distortion produced by arc welding one joint is offset by welding at least one other joint.

23. Apparatus for arc welding parts to a receiver body to make a receiver for a weapon, said apparatus comprising:
a fixture for holding said parts to said receiver body, said parts and said body defining joints to be arc welded, each joint of said joints having a periphery and a center, said fixture holding said parts so that said joints are accessible;
at least one arc welding torch in spaced relation to said fixture so that said torch can arc weld said parts to said receiver body at said joints;
means for controlling said at least one arc welding torch so that said torch arc welds said parts to said receiver body at said joints in a predetermined sequence;
a first gas mixture;
means in spaced relation to said fixture for directing said first gas mixture at each joint so as to establish an environment at said joint for arc welding;
means in spaced relation to said fixture for cooling said joints after said part and said receiver body are welded, said controlling means heating said joint at a first temperature until molten and heating said center of said joint at a second lower temperature so that said center cools slower than said periphery of said joint.

24. The apparatus as recited in claim 23, further comprising means for rotating said fixture with respect to said at least one torches so that said joints are presented for welding.

25. The apparatus as recited in claim 23, wherein said cooling means further comprises:
a second gas mixture; and
means for directing said second gas mixture at said joints.

26. The apparatus as recited in claim 23, wherein said cooling means further comprises:
a second gas mixture;
means for directing said second gas mixture at said joints; and
means for preheating said second gas mixture to a first temperature so that said second gas mixture cools from said first temperature to a second temperature when directed to said joints.

27. The apparatus as recited in claim 23, wherein said first gas mixture includes up to 4% oxygen.

28. A process for welding a first part to a second part, said process comprising the steps of:
placing said first part proximate to said second part so as to define a joint therebetween;
distorting said first part;
applying a first electrical potential difference between a wire and said first part near said joint;
blowing a first gas mixture onto said joint to displace substantially all air from the vicinity of said joint;
moving said wire proximate to said joint until said first part, said second part and said wire becoming molten, said molten wire fills said joint, diffusing into said first part and said second part;
continuing to heat said first part until said first part is not distorted; and
blowing a second gas mixture onto said joint to cool said joint.

29. The process as recited in claim 28, wherein said second gas includes Carbon Dioxide ($CO_2$).

30. The process as recited in claim 28, wherein said blowing step further comprises the step of preheating said second gas for an interval of time before said gas is blown onto said joint so that said second gas is warmed when it first reaches said joint, but cools by the end of said interval of time.

31. The process as recited in claim 28, wherein said joint has a center and a periphery, and said process further comprises the steps of
reducing said first electrical potential difference to a second electrical potential difference lower than said first potential difference after said first and said second parts become molten; and
applying said second electrical potential difference to said center so that cooling is slowed in said center with respect to said periphery for a period of time less than approximately one second and more than approximately one-quarter second.

32. The process as recited in claim 28, where said first gas mixture contains up to 4% oxygen.

33. A process for arc welding a plurality of parts to a body, said body having a first side and an opposing, second side, said plurality of parts including a first part on said first side and a second part on said second side, said process comprising the steps of:
placing said body in a fixture;
placing each part of said plurality of parts in engagement with said body, said each part and said body defining a joint therebetween;
arc welding said first part to said first side in the presence of a first gas mixture, said arc welding step resulting in a distortion of said body;
arc welding said second part to said second side in the presence of said first gas mixture so that said second part is welded to said body and said distortion is offset; and
cooling said plurality of parts and said body with a second gas mixture alter each part of said plurality of parts has been arc welded for a period of time after said joints are welded.

34. The process as recited in claim 33, wherein at least one part of said plurality of parts defines at least two symmetric joints with said body, said process further comprises the steps of arc welding said symmetric joints substantially simultaneously.

35. The process as recited in claim 33, wherein said body placing step further comprises the step of distorting said body.

36. The process as recited in claim 33, wherein first gas mixture of said arc welding step includes up to approximately 4% oxygen.

37. The process as recited in claim 33, wherein said second gas mixture includes Carbon Dioxide ($CO_2$).

38. The process as recited in claim 33, wherein said cooling step further comprises the step of lowering the temperature of said second gas mixture from a first temperature to a lower, second temperature during said interval.

39. The process as recited in claim 33, wherein said each joint has a center and a periphery, and said arc welding step further comprises the steps of:
heating said periphery until said each part and said body are molten at said joint; and then
heating said center.

40. The process as recited in claim 33, wherein each joint is adjacent to at least one adjacent joint and is not adjacent to at least one nonadjacent joint, and wherein said arc welding step further comprises arc welding nonadjacent joint after welding said each joint.

41. A process for making a receiver for a weapon, wherein said receiver body has a first side and an opposing second side, and said joints include a first joint on said first side and a second joint on said second side of said receiver body, said process comprising the steps of:
forming a receiver body from sheet steel;
placing said receiver body in a fixture;
clamping metal parts of said receiver to said receiver body, said parts and said body defining joint therebetween;
arc welding said parts to said receiver body in the presence of a first gas mixture by
arc welding said first joint on said first side, said arc welding producing a first distortion of said receiver body, and
arc welding said second joint on said second side so that said second joint is welded, said arc welding of said second joint producing a second distortion, said first and said second distortion off-setting each other; and
removing said receiver from said fixture.

42. The process as recited in claim 41, wherein said receiver body is formed with a distortion so that said distortion is eliminated by the step of arc welding said parts.

43. The process as recited in claim 41, further comprising the steps of cooling said joints following said arc welding step.

44. The process as recited in claim 41, further comprising the steps of:
warming a second gas mixture to a first temperature; and
blowing said warmed second gas mixture onto said joints after each joint is arc welded;
allowing said warmed second gas mixture to cool from said first temperature to a second, lower temperature to cool said joint gradually in a first interval.

45. The process as recited in claim 41, wherein said arc welding step is performed by a welding torch having a tip that becomes hot in arc welding and said process further comprises the step of blowing a second gas mixture by said tip and onto said joints after said joints are arc welded so that said gas mixture can absorb heat from said torch, whereby said gas mixture is preheated to a first temperature before striking said arc welded joint, said gas mixture cooling from said first temperature to a second, lower temperature.

46. The process as recited in claim 41, further comprising the step of cooling said arc welded joints until said joints are no longer red hot.

47. The process as recited in claim 41, wherein said joints have a center and a periphery, and wherein said arc welding step further comprises the steps of:
heating said periphery until said receiver body and said part are molten near said joint;
heating said center.

48. The process as recited in claim 41, wherein said arc welding of said joints is done in a sequence so that distortion produced by arc welding one joint is offset by welding at least one other joint.

49. A process for making a receiver for a weapon, said process comprising the steps of:
forming a receiver body from sheet steel;
placing said receiver body in a fixture;
clamping metal parts of said receiver to said receiver body, said parts and said body defining joints therebetween;
arc welding said parts to said receiver body in the presence of a first gas mixture and in a sequence so that distortion produced by arc welding one joint is offset by welding at least one other joint; and removing said receiver from said fixture.

50. The process as recited in claim 49, wherein said receiver body is formed with a distortion so that said distortion is eliminated by the step of arc welding said parts.

51. The process as recited in claim 49, further comprising the steps of cooling said joints following said arc welding step.

52. The process as recited in claim 49, further comprising the steps of:

warming a second gas mixture to a first temperature; and blowing said warmed second gas mixture onto said joints after each joint is arc welded;

allowing said warmed second gas mixture to cool from said first temperature to a second, lower temperature to cool said joint gradually in a first interval.

53. The process as recited in claim 49, wherein said arc welding step is performed by a welding torch having a tip that becomes hot in arc welding and said process further comprises the step of blowing a second gas mixture by said tip and onto said joints after said joints are arc welded so that said gas mixture can absorb heat from said torch, whereby said gas mixture is preheated to a first temperature before striking said arc welded joint, said gas mixture cooling from said first temperature to a second, lower temperature.

54. The process as recited in claim 49, further comprising the step of cooling said arc welded joints until said joints are no longer red hot.

55. The process as recited in claim 49, wherein said joints have a center and a periphery, and wherein said arc welding step further comprises the steps of:

heating said periphery until said receiver body and said part are molten near said joint;

heating said center.

56. The process as recited in claim 49, wherein said receiver body has a first side and an opposing, second side, and said joints include a first joint on said first side and a second joint on said second side of said receiver body, said arc welding step further comprising the steps of:

arc welding said first joint on said first side, said arc welding producing a first distortion of said receiver body; and arc welding said second joint on said second side so that said second joint is welded, said arc welding of said second joint producing a second distortion, said first and said second distortion off-setting each other.

* * * * *

UNITED STATES PATENT AND TRADEMARK OFFICE
CERTIFICATE OF CORRECTION

PATENT NO. : 5,440,099
APPLICATION NO. : 08/172836
DATED : August 8, 1995
INVENTOR(S) : Walt Smith Page 1 of 1

It is certified that error appears in the above-identified patent and that said Letters Patent is hereby corrected as shown below:

Title Page, Item (73) Assignee: Should Read, Assignee: FN Manufacturing, LLC, Columbia, S.C.

Signed and Sealed this

Nineteenth Day of February, 2008

JON W. DUDAS
*Director of the United States Patent and Trademark Office*